United States Patent Office 3,066,020
Patented Nov. 27, 1962

3,066,020
METHOD OF COMBATING WEEDS
Harry Tilles, El Cerrito, and Joe Antognini, Mountain View, Calif., assignors to Stauffer Chemical Company, a corporation of Delaware
No Drawing. Filed Aug. 8, 1958, Ser. No. 753,876
5 Claims. (Cl. 71—2.5)

This application is a continuation-in-part of our application Serial No. 650,094, filed April 2, 1957, now abandoned.

This invention relates to certain esters of thiolcarbamates wherein the nitrogen atom forms part of a heterocyclic ring as herbicides. More specifically, the invention relates to compounds of the general formula

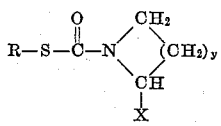

wherein R is a lower alkyl radical, either straight or branched chain, a lower alkenyl radical, a lower alkynyl radical, a lower-chloroalkyl radical, a lower chloroalkenyl radical or a methoxy lower alkyl radical, X is hydrogen or a lower alkyl group and y is 2 or 3.

The compounds of the present invention may be made in accordance with the following non-limiting examples. Code numbers have been assigned to each compound and are used throughout the balance of the application.

Example 1 (R–1817)

A three neck 500 cc. flask provided with stirrer, condenser and dropping funnel was flushed out with argon. 300 cc. of anhydrous isopropanol was added and this was followed by the addition of 3.6 g. (0.15 mole) of sodium hydride. The mixture was heated until solution was complete, cooled again to room temperature and 25 g. (0.403 mole) of ethanethiol was rapidly added. 200 cc. of isopropanol-ethanethiol mixture was then distilled and 100 cc. of anhydrous xylene was then added. 99 cc. of solvent mixture was then distilled and 100 cc. more anhydrous xylene was added. 100 cc. of mixture was distilled and 100 cc. of xylene was added. 150 cc. of mixture was distilled and 100 cc. of xylene was added. 100 cc. of mixture was distilled and 100 cc. of xylene was added. 22.1 g. (0.15 mole) of N,N-pentamethylenecarbamyl chloride was then added in 5 minutes to the refluxing mixture. The mixture was then gently refluxed for 8 hours, cooled and filtered. The filtrate was concentrated on the steam bath and the residual liquid was fractionally distilled through an 18″ Heli-Grid Podbielniak fractional distillation column. There was obtained 14.4 g. (55.5% yield) of ethyl 1-piperidinecarbothiolate, B.P. (31.5 mm.) 150.5°–151.0° C., $n_D^{25}$ 1.5168.

Example 2 (R–1819)

When the general procedure of Example 1 was repeated except that 14.3 g. (0.188 mole) of n-propyl mercaptan, 3.6 g. (0.15 mole) of sodium hydride and 22.1 g. (0.15 mole) of N,N-pentamethylenecarbamyl chloride were employed, there was obtained 18.3 g. (65.3% yield) of n-propyl-1-piperidinecarbothiolate, B.P. (11.5 mm.) 139.5°–142° C., $n_D^{25}$ 1.5118.

Example 3 (R–1820)

When the general procedure of Example 1 was repeated except that 25 g. (0.52 mole) of methanethiol, 3.6 g. (0.15 mole) of sodium hydride and 22.1 g. (0.15 mole) of N,N-pentamethylenecarbamyl chloride were employed, there was obtained 14.7 g. (61.3% yield) of methyl-1-piperidinecarbothiolate, B.P. (16 mm.) 124.5°–125.0° C., $n_D^{22}$ 1.5248.

Example 4 (R–1824)

When the general procedure of Example 1 was repeated except that 14.3 g. (0.188 mole) of isopropyl mercaptan, 3.6 g. (0.15 mole) of sodium hydride and 22.1 g. (0.15 mole) of N,N-pentamethylenecarbamyl chloride were employed, there was obtained 12.7 g. (45.2% yield) of isopropyl-1-piperidinecarbothiolate, B.P. (17 mm.) 138.0°–138.2° C. $n_D^{27}$ 1.5083.

Example 5 (R–2184)

10 g. (0.080 mole) of ethyl chlorothiolformate was dissolved in 125 cc. of ethyl ether and the solution cooled to 5°–10° C., in an ice bath. 16.3 g. (0.165 mole) of 2-methylpiperidine was slowly added, keeping the mixture cool by means of an ice bath. The reaction mixture was then filtered from the solid amine hydrochloride and the ether filtrate concentrated on a steam bath. The final solvent was removed using a Rinco Rotating Evaporator at 25° C. and 25 mm. pressure. A residue was obtained of 14.6 g. (97.4% yield) of ethyl 1-(2-methyl)-piperidinecarbothiolate, $n_D^{30}$ 1.5090.

Example 6 (R–2185)

When the general procedure of Example 5 was repeated except that 14.7 g. (0.148 mole) of 2-methylpiperidine and 10 g. (0.072 mole) of n-propyl chlorothiolformate were employed, there was obtained 12.0 g. (82.1% yield) of n-propyl 1-(2-methyl) piperidinecarbothiolate, $n_D^{30}$ 1.5055.

Example 7 (R–2186)

When the general procedure of Example 5 was repeated except that 13.3 g. (0.134 mole) of 2-methylpiperidine and 10 g. (0.066 mole) of n-butyl chlorothiolformate were employed, there was obtained 13.1 g. (92.8% yield) of n-butyl 1-(2-methyl) piperidinecarbothiolate, $n_D^{30}$ 1.5021.

Example 8 (R–2080)

10 g. (0.080 mole) of ethyl chlorothiolformate was dissolved in 125 cc. of ethyl ether and the solution was cooled to 5°–10° C. in an ice bath. 11.7 g. (0.165 mole) of pyrrolidine was slowly added, keeping the reaction mixture cool by means of an ice bath. The reaction mixture was then filtered from the solid amine hydrochloride and the ether filtrate was concentrated on the steam bath. The final solvent was removed using a Rinco Rotating Evaporator at 25° C. and 22 mm. pressure. There was obtained a residue 11.4 g. (89.0% yield) of ethyl 1-pyrrolidinecarbothiolate, $n_D^{24}$ 1.5166.

Example 9 (R–2081)

When the general procedure of Example 8 was repeated except that 10.5 g. (0.148 mole) of pyrrolidine and 10 g. (0.072 mole) of n-propyl chlorothiolformate were employed, there was obtained 11.5 g. (92.0% yield) of n-propyl 1-pyrrolidinecarbothiolate, $n_D^{26.5}$ 1.5095.

Example 10 (R–2082)

When the general procedure of Example 8 was repeated except that 9.5 g. (0.134 mole) of pyrrolidine and 10 g. (0.066 mole) of n-butyl chlorothiolformate were employed, there was obtained 11.7 g. (95.0% yield) of n-butyl 1-pyrrolidinecarbothiolate, $n_D^{26.5}$ 1.5066.

Example 11 (R–2083)

When the general procedure of Example 8 was repeated except that 9.5 g. (0.134 mole) of pyrrolidine and 10 g. (0.066 mole) of isobutyl chlorothiolformate were employed, there was obtained 12.0 g. (97.5% yield) of isobutyl 1-pyrrolidinecarbothiolate, $n_D^{27}$ 1.5044.

Example 12 (R–2364)

A 500 cc. 4 neck flask was provided with stirrer, thermometer, condenser, and gas inlet tube. A solution of 17 g. (0.20 mole) of piperidine and 20.2 g. (0.20 mole) of triethylamine in 150 cc. of tert. butyl alcohol was charged to the flask and then 16 g. (0.27 mole) of carbonyl sulfide was bubbled into the amine solution with rapid stirring, maintaining the temperature between 17°–21° C. with ice cooling, 22.2 g. (0.20 mole) of 2,3-dichloro-1-propene was then added rapidly at 16° C. The temperature rose slowly to 24.5° C. in 13 minutes. The reaction mixture was then gradually heated to reflux during the next 3 hours. After reflux was reached, 125 cc. of solvent was distilled, the residual slurry was cooled to room temperature, diluted with 200 cc. of petroleum ether, B.P. 30–60° C. and successively washed with 2–50 cc. portions of water, 2–50 cc. portions of dilute hydrochloric acid (5 cc. of concentrated hydrochloric acid made up to a volume of 50 cc. with water) and 2–50 cc. portions of water. The organic phase was then dried over anhydrous magnesium sulfate, filtered, and the filtrate was concentrated on the steam bath. The residual liquid was then fractionally distilled through an 18″ Podbielniak Heli-Grid Fractional Distillation Column. There was obtained 23.9 g. (54.5% yield) of 2-chloroallyl 1-piperidine carbothiolate, B.P. (4.5 mm.) 144–145° C., $n_D^{30}$ 1.5385.

Analysis.—Calculated for $C_9H_{14}ClNOS$: N=6.36%. Found: N=6.48%.

*Example 13 (R-2383)*

When the general procedure of Example 12 was repeated except that 17 g. (0.20 mole) of piperidine, 20.2 g. (0.20 mole) of triethylamine, 16 g. (0.27 mole) of carbonyl sulfide, 16.1 g. (0.20 mole) of chlorodimethyl ether and 150 cc. tert. butyl alcohol solvent were employed, there was obtained 22.0 g. (58.0 yield) of methoxymethyl 1-piperidinecarbothiolate, B.P. (4.5 mm.) 126.5–127.0° C., $n_D^{30}$ 1.5168.

Analysis.—Calculated for $C_8H_{15}NO_2S$: N=7.39%. Found: N=7.28%.

*Example 14 (R-2384)*

When the general procedure of Example 12 was repeated except that 19.8 g. (0.20 mole) of 2-methylpiperidine, 20.2 g. (0.20 mole) of triethylamine, 16 g. (0.27 mole) of carbonyl sulfide, 16.1 g. (0.20 mole) of chlorodimethyl ether and 150 cc. of tert. butyl alcohol solvent were employed, there was obtained 21.2 g. (52.1% yield) of methoxymethyl 1-(2-methyl) piperidinecarbothiolate, B.P. (4.5 mm.) 130.0–131.0° C., $n_D^{30}$ 1.5123.

Analysis.—Calculated for $C_9H_{17}NO_2S$: N=6.89%. Found: N=7.15%.

*Example 15 (R-2405)*

When the general procedure of Example 12 was repeated except that 14.2 g. (0.20 mole) of pyrrolidine, 20.2 g. (0.20 mole) of triethylamine, 16 g. (0.27 mole) of carbonyl sulfide, 16.1 g. (0.20 mole) of chlorodimethyl ether and 150 cc. of tert. butyl alcohol were employed, there was obtained 11.7 g. (33.4% yield) of methoxymethyl 1-pyrrolidinecarbothiolate, B.P. (4.5 mm.) 126.0–126.5° C., $n_D^{30}$ 1.5167.

Analysis.—Calculated for $C_7H_{13}NO_2S$: N=7.99%. Found: N=7.78%.

*Example 16 (R-2429)*

A solution of 30.5 g. (0.15 mole) of 3-hydroxypropyl 1-piperidine carbothiolate, 75 cc. of benzene and 1 drop of pyridine was cooled to 1° C. 22.4 g. (0.188 mole) of cold thionyl chloride was then added rapidly to the solution which was being cooled in an ice bath. The temperature of the reaction mixture rose rapidly to 19° C. The mixture was then heated to reflux. Gas evolution began at 40° C. The mixture was refluxed for 45 min., cooled to room temperature, diluted with 100 cc. of ethyl ether and washed with 3–50 cc. portions of water. It was then dried over anhydrous magnesium sulfate, filtered, and the filtrate concentrated on the steam bath. The residual liquid was then fractionally distilled. There was obtained 10.0 g. (29% yield) of 3-chloropropyl 1-piperidinecarbothiolate, B.P. (4.5 mm.) 156–158° C., $n_D^{30}$ 1.5278.

Analysis.—Calculated for $C_9H_{16}ClNOS$: N=6.30%; Cl=15.99%. Found: N=6.21%; Cl=15.87%.

*Example 17 (R-2430)*

When the general procedure of Example 12 was repeated except that 17 g. (0.20 mole) of piperidine, 20.2 g. (0.20 mole) of triethylamine, 17 g. (0.27 mole) of carbonyl sulfide, 23.8 g. (0.20 mole) of propargyl bromide and 150 cc. of tert. butyl alcohol were employed, there was obtained 10.2 g. (27.7% yield) of propargyl 1-piperidinecarbothiolate, B.P. (4.5 mm.) 133.5°–134.0° C., $n_D^{30}$ 1.5393.

Analysis.—Calculated for $C_9H_{13}NOS$: N=7.64%. Found: N=7.49%.

*Example 18 (R-2432)*

When the general procedure of Example 16 was repeated except that 28.4 g. (0.15 mole) of 2-hydroxyethyl 1-piperidinecarbothiolate, 1 drop of pyridine, 75 cc. of benzene and 22.4 g. (0.188 mole) of thionyl chloride were employed, there was obtained 28 g. (89.7% yield) of undistilled 2-chloroethyl 1-piperidinecarbothiolate, $n_D^{30}$ 1.5370.

Analysis.—Calculated for $C_{18}H_{14}ClNOS$: N=6.74%; Cl=17.07%. Found: N=6.77%; Cl=16.57%.

*Example 19 (R-2467)*

When the general procedure of Example 12 was repeated except that 19.8 g. (0.20 mole) of 2-methylpiperidine, 20.2 g. (0.20 mole) of triethylamine, 17 g. (0.27 mole) of carbonyl sulfide, 23.8 g. (0.20 mole) of propargyl bromide and 150 cc. of tert, butyl alcohol were employed, there was obtained 12.4 g. (31.6% yield) of propargyl 1-(2-methyl)piperidinecarbothiolate, B.P.). 4.5 mm.) 135.5°–138.0° C., $n_D^{30}$ 1.5329.

Analysis.—Calculated for $C_{10}H_{15}NOS$: N=7.09%. Found: N=7.23%.

*Example 20 (R-2469)*

When the general procedure of Example 12 was repeated except that 14.2 g. (0.20 mole) of pyrrolidine, 20.2 g. (0.20 mole) of triethylamine, 17 g. (0.27 mole) of carbonyl sulfide, 23.8 g. (0.20 mole) of propargyl bromide and 150 cc. of tert. butyl alcohol were employed, there was obtained 18.0 g. (53.4% yield) of propargyl 1-pyrrolidinecarbothiolate, B.P. (4.5 mm.) 133.5°–134.0° C., $n_D^{30}$ 1.5430.

Analysis.—Calculated for $C_8H_{11}NOS$: N=8.29%. Found: N=8.48%.

*Example 21 (R-2504)*

When the general procedure of Example 12 was repeated except that 29.7 g. (0.30 mole) of 2-methylpiperidine, 30.3 g. (0.30 mole) of triethylamine, 24 g. (0.40 mole) of carbonyl sulfide, 148 g. (1.50 moles) of ethylene chloride and 150 cc. of tert. butyl alcohol were employed, there was obtained 4.5 g. of product, B.P. (0.4 mm.) 120–123° C., $n_D^{30}$ 1.5338. Infra-red spectrographic analysis shows that this product is predominantly 2-chloroethyl 1-(2-methyl) piperidinecarbothiolate.

The compounds of the present invention have been tested as herbicides and found very effective as the following typical tests show. Some of the compounds are quite selective in their action and can be used to eradicate or control one type of plant, while another type of plant is relatively unaffected.

In making the following tests, seeds were planted in 3″ pots and shortly thereafter the compound under tests was applied to the pots in a drench at the rate of 365 pounds per acre. The pots were placed in a greenhouse and watered at suitable intervals and the germination and growth of the seeds was compared with similarly planted seeds to which no herbicide was added. In each case, germination was reported on the scale of 0–100%, while growth was reported on a scale of 0–10%, based on the seeds which germinated. Thus, 100–10 indicates normal germination and normal growth.

The following data were obtained:

| Compound | Oats | | Cucumbers | | Radish | |
|---|---|---|---|---|---|---|
| | Germ. | Growth | Germ. | Growth | Germ. | Growth |
| R-1817 | 0 | | 0 | | 50 | 4 |
| R-1819 | 60 | 1 | 20 | 2 | 10 | 1 |
| R-1820 | 0 | | 0 | | 0 | |
| R-1824 | 0 | | 0 | | 0 | |
| R-2184 | 0 | | 0 | | 0 | |
| R-2185 | 0 | | 0 | | 0 | |
| R-2186 | 0 | | 0 | | 25 | 6 |
| R-2080 | 0 | | 0 | | 0 | |
| R-2081 | 0 | | 0 | | 0 | |
| R-2082 | 0 | | 0 | | 0 | |
| R-2083 | 0 | | 0 | | 0 | |
| R-2383 | 0 | | 0 | | 0 | |
| R-2384 | 0 | | 0 | | 0 | |
| R-2405 | 0 | | 0 | | 15 | 3 |
| R-2429 | 0 | | 0 | | 15 | 0+ |
| R-2430 | 0 | | 0 | | 0 | |
| R-2432 | 0 | | 0 | | 0 | |
| R-2467 | 0 | | 0 | | 0 | |
| R-2469 | 0 | | 0 | | 0 | |
| R-2504 | 0 | | 0 | | 25 | 1 |

The tests were then repeated using various application rates with the following results:

| Compound | Rate/Acre, lb. | Peas | | Corn | | Cucurbits | | Rye | | Radish | |
|---|---|---|---|---|---|---|---|---|---|---|---|
| | | Germination | Growth | Germination | Growth | Germination | Growth | Germination | Growth | Germination | Growth |
| R-1820 | 20 | 100 | 9 | 100 | 10 | 100 | 10 | 90 | 2 | 100 | 6 |
| | 80 | 100 | 4 | 100 | 3 | 100 | 10 | 100 | 2 | 10 | 0 |
| R-1817 | 20 | 100 | 6 | 100 | 10 | 100 | 9 | 100 | 1 | 10 | 1 |
| | 80 | 90 | 4 | 100 | 9 | 100 | 8 | 100 | 1 | 0 | |
| R-1819 | 20 | 100 | 7 | 100 | 10 | 100 | 10 | 80 | 1 | 60 | 6 |
| | 80 | 60 | 5 | 100 | 10 | 100 | 9 | 50 | 1 | 20 | 5 |
| R-1824 | 20 | 100 | 4 | 100 | 10 | 100 | 10 | 100 | 3 | 80 | 7 |
| | 80 | 80 | 2 | 100 | 10 | 100 | 10 | 100 | 3 | 20 | 0 |
| R-2184 | 10 | 100 | 2 | 100 | 9 | 100 | 10 | 0 | | 0 | |
| | 40 | 100 | 1 | 100 | 6 | 100 | 10 | 0 | | 0 | |
| R-2185 | 10 | 75 | 1 | 100 | 10 | 100 | 10 | 0 | | 0 | |
| | 40 | 0 | | 100 | 5 | 100 | 10 | 0 | | 0 | |
| R-2186 | 10 | 100 | 33 | 100 | 10 | 100 | 10 | 0 | | 100 | 8 |
| | 40 | 25 | 1 | 100 | 5 | 100 | 10 | 0 | | 25 | 7 |
| R-2080 | 10 | 75 | 4 | 100 | 10 | 100 | 10 | 100 | 6 | 50 | 6 |
| | 40 | 25 | 2 | 100 | 10 | 100 | 7 | 100 | 5 | 5 | 0+ |
| R-2081 | 10 | 75 | 4 | 100 | 8 | 100 | 9 | 100 | 6 | 25 | 4 |
| | 40 | 25 | 1 | 100 | 8 | 100 | 7 | 100 | 4 | 0 | |
| R-2082 | 10 | 100 | 10 | 100 | 10 | 100 | 10 | 75 | 1 | 50 | 6 |
| | 40 | 100 | 9 | 100 | 7 | 100 | 10 | 0 | | 0 | |
| R-2083 | 10 | 100 | 10 | 100 | 10 | 100 | 10 | 75 | 2 | 50 | 6 |
| | 40 | 100 | 9 | 100 | 8 | 50 | 10 | 25 | 1 | 0 | |
| R-2383 | 10 | 100 | 7 | 100 | 10 | 100 | 2 | 50 | 2 | 100 | 10 |
| | 40 | 75 | 4 | 100 | 6 | 15 | 2 | 0 | | 100 | 10 |
| R-2384 | 10 | 15 | 1 | 100 | 10 | 25 | 3 | 0 | | 100 | 10 |
| | 40 | 15 | 1 | 100 | 6 | 0 | | 0 | | 100 | 7 |
| R-2405 | 10 | 100 | 9 | 100 | 10 | 100 | 8 | 25 | 4 | 100 | 10 |
| | 40 | 100 | 6 | 100 | 7 | 0 | | 0 | | 75 | 7 |
| R-2429 | 10 | 100 | 7 | 100 | 10 | 50 | 3 | 0 | | 100 | 10 |
| | 40 | 100 | 5 | 100 | 10 | 15 | 1 | 0 | | 100 | 10 |
| R-2430 | 10 | 100 | 6 | 100 | 10 | 50 | 4 | 100 | 10 | 100 | 10 |
| | 40 | 100 | 4 | 100 | 7 | 0 | | 75 | 6 | 100 | 9 |
| R-2432 | 10 | 100 | 8 | 100 | 10 | 25 | 3 | 50 | 1 | 100 | 9 |
| | 40 | 100 | 2 | 100 | 10 | 25 | 1 | 25 | 0+ | 100 | 7 |
| R-2467 | 10 | 100 | 3 | 100 | 10 | 100 | 7 | 25 | 2 | 100 | 10 |
| | 40 | 50 | 1 | 100 | 7 | 0 | | 15 | 2 | 25 | 1 |
| R-2469 | 10 | 100 | 9 | 100 | 10 | 100 | 10 | 100 | 10 | 100 | 8 |
| | 40 | 100 | 6 | 100 | 8 | 25 | 3 | 50 | 6 | 100 | 5 |
| R-2504 | 10 | 75 | 3 | 100 | 10 | 75 | 5 | 0 | | 100 | 10 |
| | 40 | 25 | 1 | 100 | 10 | 25 | 2 | 0 | | 100 | 8 |

The compounds of the present invention may be used as pre-emergence or post-emergence herbicides and may be applied in a variety of ways at various concentrations. They may be combined with suitable carriers and applied as dusts, sprays or drenches. The amount applied will depend on the nature of the seeds or plants to be controlled and the rate of application may vary from 1 to 500 pounds per acre. One particularly advantageous way of applying the compounds is as a narrow band along a row crop, straddling the row.

We claim:
1. The method of combating weeds comprising applying a phytotoxic amount to the soil of a compound

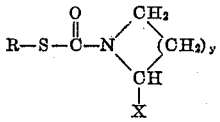

wherein R is a member selected from the group consisting of lower alkyl radicals, lower chloroalkyl radicals and lower methoxy alkyl radicals, X is a member of the class consisting of hydrogen and lower alkyl groups and y is selected from 2 and 3.

2. The method of claim 1 wherein the compound is applied at the rate of 1 to 500 pounds per acre.

3. A method of combating weeds comprising applying a phytotoxic amount to the soil of the compound methoxymethyl-1-(2-methyl)-piperidinecarbothiolate.

4. A method of combating weeds comprising applying a phytotoxic amount to the soil of the compound n-propyl-1-(2-methyl)-piperidinecarbothiolate.

5. A method of combating weeds comprising applying a phytotoxic amount to the soil of the compound 3-chloropropyl 1-piperidinecarbothiolate.

References Cited in the file of this patent
UNITED STATES PATENTS

| 2,060,733 | Hunt et al. | Nov. 10, 1936 |
| 2,160,880 | Loone et al. | June 6, 1939 |
| 2,384,074 | Chenicek | Sept. 4, 1945 |
| 2,631,935 | Baumgartner | Mar. 17, 1953 |
| 2,650,876 | Stewart | Sept. 1, 1953 |
| 2,744,898 | Harman | May 8, 1956 |
| 2,847,419 | Harman | Aug. 12, 1958 |

OTHER REFERENCES

Richter et al., in "Chemical Abstracts," vol. 49, column 186(1), 187 (1955).